March 12, 1935.    R. L. ANDERSON    1,994,298
COMBINE
Filed Sept. 16, 1932
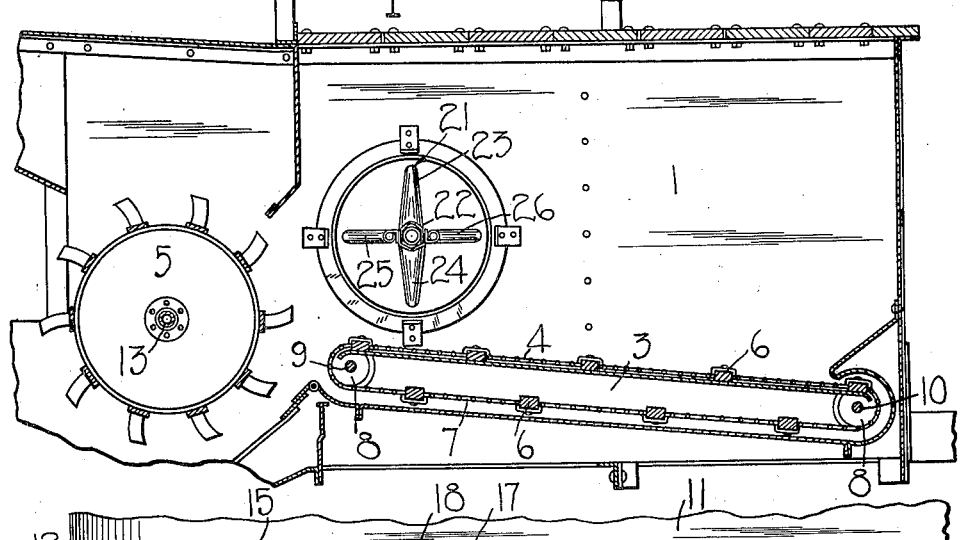
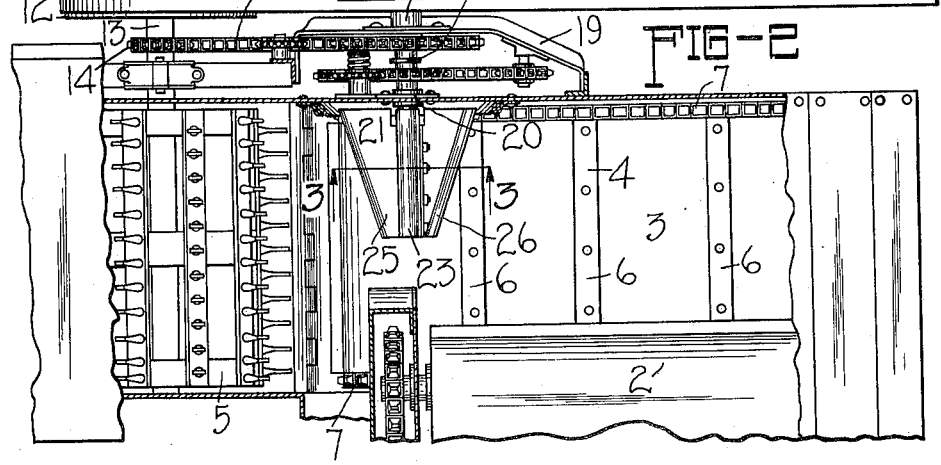
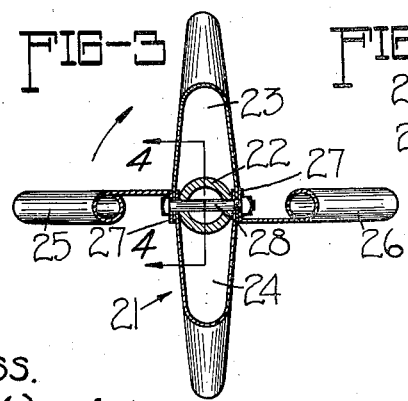
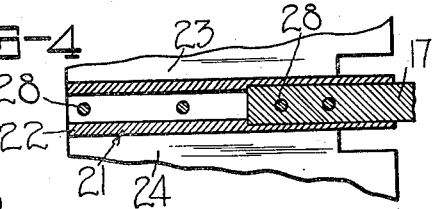
INVENTOR.
RALPH L ANDERSON
BY *W.C. Jirdinston*
ATTORNEY.
WITNESS.
*Edward Melin*

Patented Mar. 12, 1935

1,994,298

UNITED STATES PATENT OFFICE 1,994,298

COMBINE

Ralph L. Anderson, Moline, Ill., assignor to Deere & Company, Moline, Ill., a corporation of Illinois Application September 16, 1932, Serial No. 633,422

4 Claims. (Cl. 130—1)

My invention relates to combined harvesters and threshers and particularly to the mechanism operating to convey the cut grain from the harvester and deliver it to the action of the threshing mechanism.

In the operation of a harvester-thresher combine the cut grain is deposited on a transversely moving platform conveyor from which it is delivered to an inclined conveyor to be carried upwardly and deposited in the feeder house of the thresher upon a conveyor acting to feed the grain to a cylindrical beater part of the thresher mechanism. Efficiency in operation necessitates a high degree of speed in both the harvester and thresher and in consequence the grain delivered to the feeder house by the inclined conveyor will accumulate on the side of the chamber opposite to the side at which the grain is delivered to the feeder house and to a slat conveyor operating to move the grain to the cylinder beater. As near as possible, the grain should be delivered to the cylinder beater evenly and to accomplish this desired condition is the principal object of my invention, which I have embodied in a device to operate upon the grain accumulation and assist the slat conveyor in delivering grain to the cylinder beater in a condition as nearly perfect as possible and at the same time eliminate the possibility of clogging the cylinder beater by stalks winding upon the beater teeth.

Referring to the drawing in which similar numerals indicate identical parts—

Figure 1 illustrates, in longitudinal section, the feeder house of a combined harvester and thresher with my invention embodied therein and shown in end elevation;

Figure 2 is a plan view, in section of Figure 1;

Figure 3 is an enlarged transverse section of my invention taken on the line 3—3 of Figure 2; and, Figure 4 is a fragmentary section on the line 4—4 of Figure 3.

Sufficient of a combined harvester and thresher has been illustrated, it is believed, to demonstrate the application and operation of my invention, the feeder house being designated as 1, and the upper end of the inclined harvester conveyor, extending into the feeder chamber, as 2. This conveyor deposits the grain on a plate 3 over which travels a slat conveyor 4 operative to deliver to the cylinder beater 5 the grain received from the inclined conveyor. The slat conveyor is composed of slats 6 spaced apart equidistant with their ends attached respectively to sprocket chains 7 traveling over sprocket wheels on the ends of rollers 8 mounted on shafts 9 and 10 supported in suitable bearings, not shown, on the side walls of the feeder house 1.

Power to actuate the mechanism stated is conveyed from a source of power by a belt 11 leading over a pulley 12 mounted on the shaft 13 of the beater 5. On the shaft 13 a sprocket 14 is mounted and connected by a chain 15 with a sprocket 16 on a shaft 17, the latter journaled in a bearing 18 on a support 19 on the side of the thresher structure, and in a bearing 20 mounted in the side of the feeder house.

As before stated, the grain delivered by the inclined conveyor 2 to the plate 3 and the slat conveyor 4 is unevenly distributed thereon, a greater amount accumulating at the side of the feeder house 1, opposite the inclined conveyor, so that there is an unequal quantity served to the cylinder beater 5. To cure this undesirable condition I have devised a beater 21 operative to facilitate passage of grain to the cylinder beater 5 and ensure an even feed thereto. The beater 21 comprises a sleeve 22 mounted on the shaft 17 and secured thereon in a manner hereinafter stated. Bolted on the sleeve 22 are, in this instance, four wings or beaters 23, 24, 25 and 26. The wings 23 and 24 are located opposite each other on the sleeve 22, and the wings 25 and 26 are similarly located relative to each other and at right angles to the wings 23 and 24, respectively.

The wings 23 and 24 are inverted U shape, the legs of the wing 24 embrace the sleeve 22, and the legs of the wing 23 overlap the legs of the wing 24 at the sleeve 22. Each of the wings 25 and 26 is a plate, the edge of which, next to the sleeve 22, is bent to form a flange 27 which is firmly bolted to the sleeve by bolts 28 extending through holes in the flanges 27, the wings 23 and 24 and the sleeve 22. The inner two bolts 28 also pass through shaft 17 to secure the beater to the shaft. The operative edge of the wing 25 is tubular, and the similar edge of the wing 26 is also tubular. An annulus is mounted on the wall of the feeder house 1 covering the wider end of the beater 21 which is tapered toward its free end.

As before stated, the grain carried to the feeder chamber is liable to pile up on the side of the feeder house, opposite the delivery of grain thereto, to a more or less degree depending upon the speed of delivery and the volume of the crop being harvested, and to accelerate the delivery to the cylindrical beater 5 I have provided the beater 21 to operate at a greater speed than the slat conveyor 4 so that the movement of piled up grain toward the beater 5 is materially hastened, the deeper part of the wings acting not only to hasten the passage of piled up grain but because of the taper of the wings there is a spreading effect to more evenly distribute the grain transversely of the slat conveyor.

What I claim is:—

1. A beater including a sleeve, a U-shaped wing having its legs embracing the sleeve, a similar wing oppositely disposed with its legs overlapping the first mentioned wing at the sleeve, wings formed of flat plates having tubular outer edges and disposed opposite each other and at right angles to the U-shaped wings, flanges formed on the inner edges of said plates and in contact with the U-shaped wings at the sleeve, and means common to the wings operating to secure the wings to the sleeve.

2. A beater including a sleeve, a U-shaped wing having its legs embracing the sleeve, a similar wing oppositely disposed with its legs overlapping the first mentioned wing at the sleeve, wings formed of flat plates having tubular outer edges and disposed opposite each other and at right angles to the U-shaped wings, flanges formed on the inner edges of said plates and in contact with the U-shaped wings at the sleeve, said wings tapered toward the free end of the sleeve, and means common to the wings operating to secure the wings to the sleeve.

3. A beater including a sleeve, a U-shaped wing having the ends of its legs bearing against opposite sides of the sleeve, a similar wing oppositely disposed to the first wing with its legs overlapping the legs thereof and means to secure said legs to the sleeve.

4. A beater including a sleeve, a U-shaped wing having the ends of its legs bearing against opposite sides of the sleeve, a similar wing oppositely disposed to the first wing with its legs overlapping the legs of the first wing, and a bolt passing through perforations in the ends of the legs of both wings and through aligned transverse holes in said sleeve.

RALPH L. ANDERSON.